US 10,858,276 B2

(12) United States Patent
Hoshino

(10) Patent No.: US 10,858,276 B2
(45) Date of Patent: Dec. 8, 2020

(54) STIRRER FOR GLASS MELTING, AND GLASS MELTING FURNACE

(71) Applicant: FURUYA METAL CO., LTD., Tokyo (JP)

(72) Inventor: Akinori Hoshino, Toyko (JP)

(73) Assignee: FURUYA METAL CO., LTD., Tokyo (JP)

( * ) Notice: Subject to any disclaimer, the term of this patent is extended or adjusted under 35 U.S.C. 154(b) by 96 days.

(21) Appl. No.: 15/129,683

(22) PCT Filed: Apr. 8, 2015

(86) PCT No.: PCT/JP2015/060942
§ 371 (c)(1),
(2) Date: Sep. 27, 2016

(87) PCT Pub. No.: WO2015/156309
PCT Pub. Date: Oct. 15, 2015

(65) Prior Publication Data
US 2017/0137312 A1 May 18, 2017

(30) Foreign Application Priority Data

Apr. 11, 2014 (JP) .................................. 2014-081584

(51) Int. Cl.
C03B 5/187 (2006.01)
C03B 5/167 (2006.01)
(52) U.S. Cl.
CPC ............ C03B 5/1675 (2013.01); C03B 5/187 (2013.01)
(58) Field of Classification Search
CPC ...... C03B 5/1675; C03B 5/187; C03B 5/1875
See application file for complete search history.

(56) References Cited

U.S. PATENT DOCUMENTS 2,515,478 A * 7/1950 Tooley ................. C03B 5/1875
266/233
3,083,109 A * 3/1963 Rhodes ................ C03B 5/1672
106/1.28
(Continued)

FOREIGN PATENT DOCUMENTS

JP 2002-180268 A 6/2002
JP 2009-523696 A 6/2009
(Continued)

OTHER PUBLICATIONS

Machine translation of jp 2011-037244 (translation date:Feb. 2, 2018). 21 pages.*
(Continued)

Primary Examiner — John M Hoffmann
(74) Attorney, Agent, or Firm — Ohlandt, Greeley, Ruggiero & Perle, L.L.P.

(57) ABSTRACT

A stirrer for glass melting which can be used over a prolonged life expectancy, while maintaining a high strength, even in an environment exposed to a high temperature and an oxygen-containing gas atmosphere for a long period of time, and can prevent the air bubbles from being mixed into the glass melt. A stirrer for glass melting is made of iridium or an iridium-based alloy, and has a rotary shaft and a stirring part, a surface region S1 of the surface of the rotary shaft above the stirring part is covered with a cylindrical cover, the cover has a two-layer structure in which an outer layer made of platinum or a platinum rhodium alloy and an inner layer made of platinum or a platinum rhodium alloy containing metal species are joined together, and oxide particles of metal species are precipitated in a dispersed state on a surface of the inner layer on an opposite side to a surface adjacent to the outer layer, wherein the stirrer for glass melting has a pipe made of iridium or an iridium-based alloy which surrounds at least (Continued)

the surface region S2 of the cover from the lower end of the cover to a predetermined height at an interval.

5 Claims, 3 Drawing Sheets

(56) References Cited

U.S. PATENT DOCUMENTS

| | | | | | |
|---|---|---|---|---|---|
| 3,230,060 | A | * | 1/1966 | Lippmann | C03B 5/1675 373/33 |
| 3,498,778 | A | * | 3/1970 | Hynd | C03B 5/187 65/178 |
| 3,549,274 | A | * | 12/1970 | Jewell | C03B 5/1672 416/224 |
| 3,622,310 | A | * | 11/1971 | Reinacher | C22C 32/0021 148/513 |
| 3,811,861 | A | * | 5/1974 | Gimenez | C03B 5/187 65/179 |
| 3,971,646 | A | * | 7/1976 | Rhodes | C03B 5/1672 65/135.3 |
| 3,988,138 | A | * | 10/1976 | Rough | C03B 3/005 65/135.3 |
| 4,252,558 | A | * | 2/1981 | Touboul | B22F 9/082 419/20 |
| 4,983,198 | A | * | 1/1991 | Ogino | C03B 5/0336 65/134.1 |
| 5,623,725 | A | * | 4/1997 | Disam | B22F 9/30 419/19 |
| 8,256,951 | B2 | * | 9/2012 | Adelsberg | B01F 7/00041 366/325.1 |
| 8,434,329 | B2 | * | 5/2013 | Singer | B01F 7/00033 65/178 |
| 2002/0112563 | A1 | * | 8/2002 | Shoji | |
| 2009/0165500 | A1 | | 7/2009 | Luebbers et al. | |
| 2012/0047958 | A1 | * | 3/2012 | Goller | |
| 2012/0073326 | A1 | * | 3/2012 | Dorfeld | |

FOREIGN PATENT DOCUMENTS

| | | |
|---|---|---|
| JP | 2011-37244 A | 2/2011 |
| JP | 2011-51858 A | 3/2011 |
| JP | 2012-180243 A | 9/2012 |

OTHER PUBLICATIONS

Machine translation (made Feb. 2, 2018) of JP 2011-037244. (Year: 2018).*
International Preliminary Report on Patentability dated Oct. 20, 2016 from corresponding PCT application No. PCT/JP2015/060942, 6 pages.
International Search Report dated Jul. 7, 2015 from corresponding International PCT application No. PCT/JP2015/060942, 5 pages.
Written Opinion dated Jul. 7, 2015 from corresponding International PCT application No. PCT/JP2015/060942, 5 pages.
Massalski, Thaddeus et al., "Binary Alloy Phase Diagrams", Second Edition, vol. 1, ASM International, 1990, 9 pages.

* cited by examiner

[Fig.3]
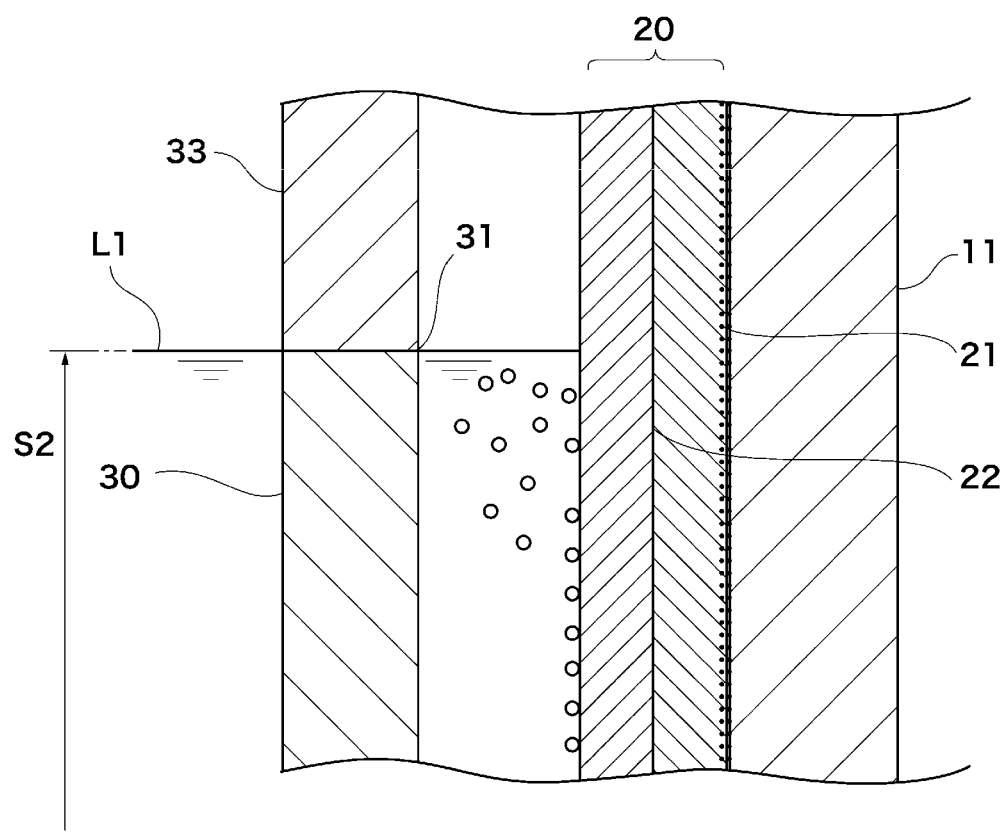

STIRRER FOR GLASS MELTING, AND GLASS MELTING FURNACE

TECHNICAL FIELD

The present invention relates to a stirrer for glass melting and a glass melting furnace including the same.

BACKGROUND ART

In a manufacturing process of a glass, an interior of a melting furnace for melting the glass becomes, for example, a high temperature of 1400 to 1600° C. and an oxygen-containing gas atmosphere. A material used for the stirrer for glass melting is required to have high strength at a high temperature and in an oxygen-containing gas atmosphere, and to have a long life expectancy. As materials that can be used at a high temperature of 1000° C. or more, platinum or iridium are known. Platinum is very stable even in an oxygen-containing gas atmosphere of 1000° C. or more, and oxidation volatile consumption thereof is small. However, there is a problem in which particles are likely to grow at the high-temperature range exceeding 1500° C., and the strength is lowered. Meanwhile, iridium has a higher strength than platinum at a high-temperature range of 1000° C. or more. However, since an amount of oxidation volatilization of iridium is about 100 times than that of platinum, there is a problem of a short life expectancy when used at the high temperature and in the oxygen-containing gas atmosphere.

The applicant has suggested a composite structure, as a member capable of being used for glass melting, in which a surface of a structure made of iridium or iridium-based alloy is covered with a cover having a two-layer structure in which an outer layer made of platinum or a platinum rhodium alloy and an inner layer made of platinum or the platinum rhodium alloy containing metal species are joined, and the oxide particles of the metal species being precipitated in a dispersed state on the surface of the inner layer on the opposite side to the outer layer side (for example, see Patent Literature 1). In the composite structure of Patent Literature 1, there is a problem in which a potential difference occurs by the contact between iridium of the structure and platinum of the cover, and air bubbles are generated from the platinum side in the glass melt. Therefore, the applicant suggests a homogenizing method of the glass melt which counteracts a potential difference generated between the structure and the cover by applying a reverse potential (for example, see Patent Literature 2).

PRIOR ART DOCUMENTS

Patent Literature

Patent Literature 1: JP 2011-37244 A
Patent Literature 2: JP 2011-51858 A

SUMMARY OF INVENTION

Problems to be Solved by the Invention

However, in the method of Patent Literature 2, since it is not possible to apply a uniform reverse potential depending on the shape of the stirrer, in some cases, it is not possible to prevent the generation of air bubbles in the glass melt.

An object of the present invention is to provide a stirrer for glass melting which can be used over a prolonged life expectancy while maintaining high strength, even in an environment exposed to a high temperature and an oxygen-containing gas atmosphere for a long period of time, and can prevent the air bubbles from being mixed into the glass melt, and a glass melting furnace including the same.

Means to Solution a Problem

A stirrer for glass melting according to the present invention is a stirrer for glass melting which is made of iridium or an iridium-based alloy, and has a rotary shaft and a stirring part provided at a lower end part of the rotary shaft, a surface region of a surface of the rotary shaft above the stirring part is covered with a cylindrical cover, the cover has a two-layer structure in which an outer layer made of platinum or a platinum rhodium alloy and to an inner layer made of platinum or a platinum rhodium alloy containing metal species are joined, and oxide particles of the metal species being precipitated in a dispersed state on a surface of the inner layer on an opposite side to the surface adjacent to the outer layer, wherein the stirrer for glass melting has a pipe which surrounds at least a surface region of the cover from the lower end of the cover to a predetermined height at an interval, the pipe being made of iridium or an iridium-based alloy.

In the stirrer for glass melting according to the present invention, it is preferable that the pipe has an extension part that extends upward from the upper end of the pipe, and the extension part being made of platinum or platinum-based alloy. It is possible to more reliably prevent the air bubbles from being mixed into the glass melt.

In the stirrer for glass melting according to the present invention, it is preferable that the pipe surrounds a surface region of the surface of the cover that is immersed into the glass melt during use. It is possible to prevent iridium of the pipe from being oxidized and volatilized. Further, it is possible to more reliably prevent the air bubbles from being mixed into the glass melt.

In the stirrer for glass melting according to the present invention, it is preferable that the pipe has an occluded part below the lower end of the cover. It is possible to more reliably prevent the air bubbles from being mixed into the glass melt.

A glass melting furnace according to the present invention including the stirrer for glass melting according to the present invention, further includes: a height adjusting mechanism which adjusts the height of the upper end of the pipe to a liquid level of the glass melt.

Effects of the Invention

The present invention can provide a stirrer for glass melting which can be used over a prolonged life expectancy, while maintaining high strength, even in an environment exposed to a high temperature and an oxygen-containing gas atmosphere for a long period of time, and can prevent the air bubbles from being mixed into the glass melt, and a glass melting furnace including the same.

BRIEF DESCRIPTION OF DRAWINGS

FIG. 3 is a partially enlarged cross-sectional view of a part B of FIG. 1.

MODE FOR CARRYING OUT THE INVENTION

While the present invention will be described in detail by illustrating an embodiment, the invention is not intended to be construed as being limited to the description. As long as the effects of the present invention are exhibited, the embodiment may be variously modified.

Figure 1:
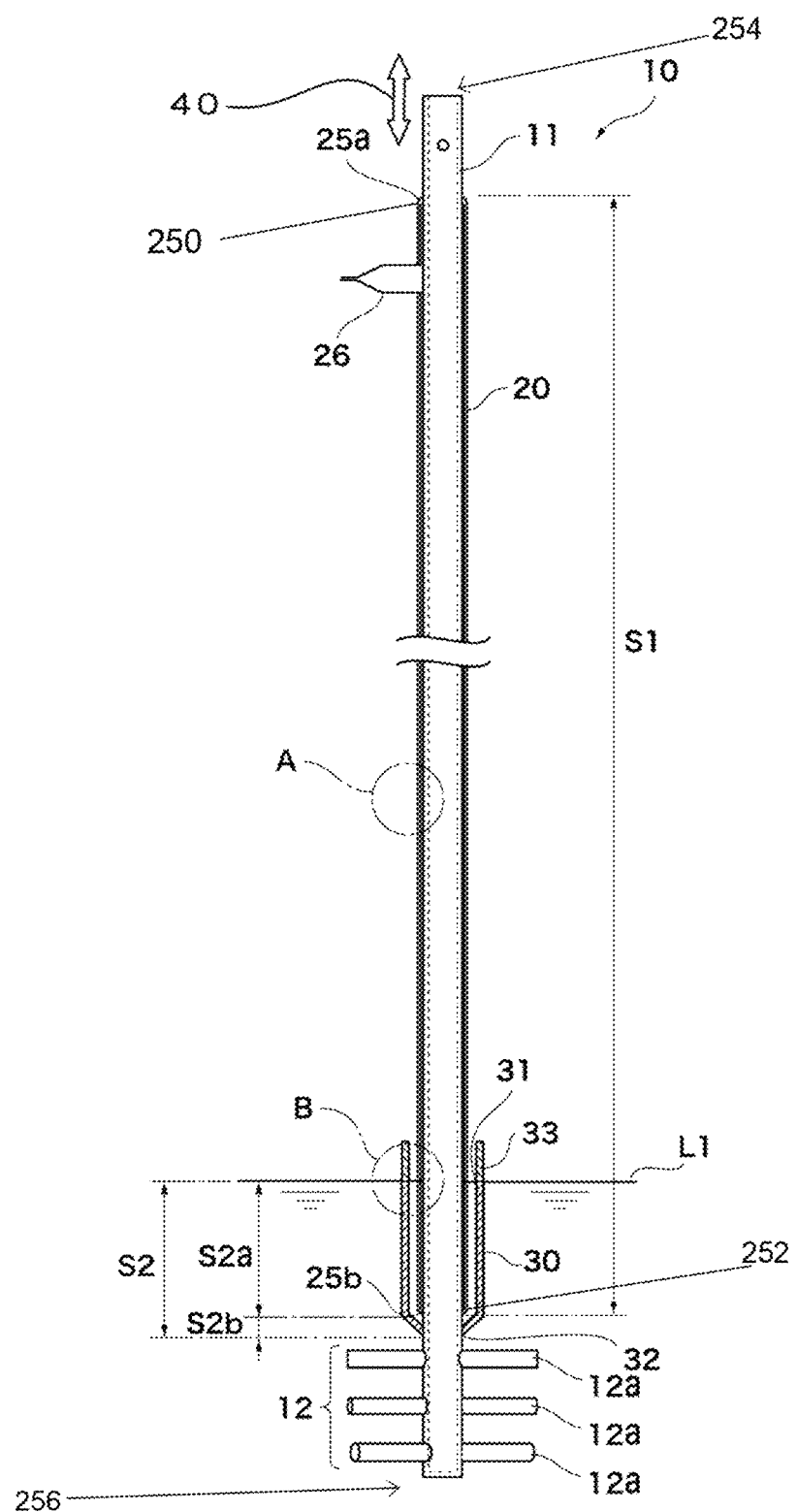
FIG. 1 is a front view illustrating an example of a stirrer for glass melting according to the present embodiment, with a cover and a pipe illustrated in a cross-sectional view.
Figure 2:
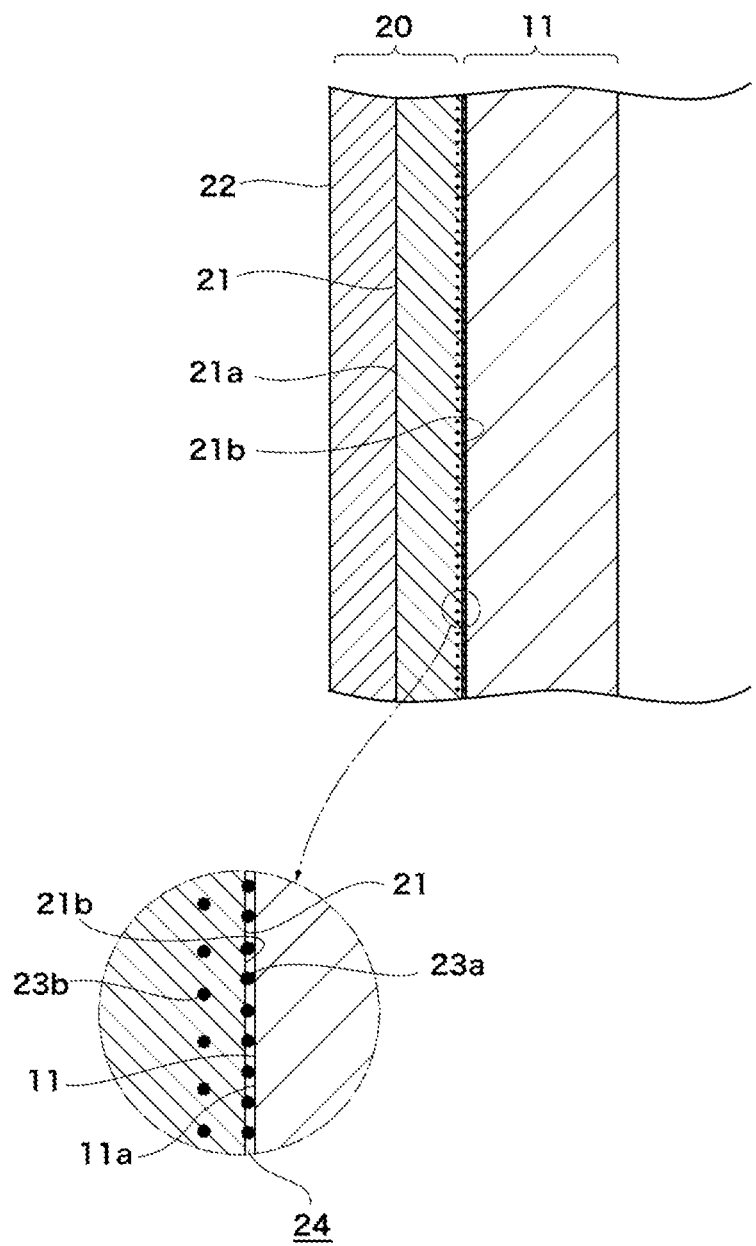
FIG. 2 is a partially enlarged cross-sectional view of a part A of FIG. 1.

As illustrated in FIG. 1, a stirrer for glass melting 10 according to the present embodiment is made of iridium or an iridium-based alloy, and has a rotary shaft 11, and a stirring part 12 provided at a lower end part of the rotary shaft 11, a surface region S1 of a surface of the rotary shaft 11 above the stirring part 12 is covered with a cylindrical cover 20, as illustrated in FIG. 2, the cover 20 forms a two-layer structure in which an outer layer 22 made of platinum or a platinum rhodium alloy and an inner layer 21 made of platinum or a platinum rhodium alloy containing metal species are joined together, and oxide particles 23a of metal species are precipitated in a dispersed state on a surface 21b of the inner layer 21 on the opposite side to a surface 21a adjacent to the outer layer 22, wherein the stirrer for glass melting 10 has a pipe 30 which surrounds at least a surface region S2 of the cover 20 from the lower end of the cover 20 to a predetermined height at an interval, and the pipe 30 is made of iridium or an iridium-based alloy.

The stirrer for glass melting 10 is a stirrer for stirring the glass melt and has the rotary shaft 11 and the stirring part 12.

The rotary shaft 11 may have a cylindrical shape as illustrated in FIG. 1 or may have a rod shape (not illustrated). When the rotary shaft 11 has a cylindrical shape, it is preferable to vacuum-seal or seal the interior of the cylinder so that the interior of the cylinder is not exposed to oxygen-containing gas. The stirring part 12 is provided at the lower end part 256 of the rotary shaft 11, and a motor (not illustrated) is connected to the upper end part 254 of the rotary shaft 11.

The rotary shaft 11 is made of iridium or an iridium-based alloy. The iridium-based alloy is an alloy containing iridium as a main component. The metal component constituting the alloy with iridium in the iridium-based alloy is preferably at least one kind selected from rhodium (Rh), rhenium (Re), molybdenum (Mo), tungsten (W), niobium (Nb), tantalum (Ta), zirconium (Zr) and hafnium (Hf). The content of iridium in the iridium-based alloy, for example, is 90 mass % or more.

The stirring part 12 in the form having a plurality of round rod-like stirring blades 12a is illustrated as an example in FIG. 1, but the present invention is not limited thereto, and for example, the stirring part 12 may be in a form having a spiral stirring blade (not illustrated), and may be in a form having a helical ribbon-like stirring blade (not illustrated).

The stirring part 12 is made of iridium or iridium-based alloy. The iridium-based alloy is an alloy containing iridium as the main component. The metal component constituting the alloy with iridium in the iridium-based alloys is preferably at least one kind selected from rhodium (Rh), rhenium (Re), molybdenum (Mo), tungsten (W), niobium (Nb), tantalum (Ta), zirconium (Zr) and hafnium (Hf). The content of iridium in the iridium-based alloy, for example, is 90 mass % or more. The rotary shaft 11 and the stirring part 12 may be an integrated member or separate members. When the rotary shaft 11 and the stirring part 12 are separate members, the rotary shaft 11 and the stirring part 12 are preferably formed of the same material.

The cover 20 has a cylindrical shape that is made to match an outer circumference shape of the rotary shaft 11. The surface region S1 in which the cover 20 is provided is a surface region of the surface of the rotary shaft 11 above the stirring part 12. As used herein, the term "above" refers to a direction directed toward the end part of a side of the rotary shaft 11 to which a motor (not illustrated) is connected. Further, the term "below" refers to a direction directed toward the end part of a side of the rotary shaft 11 on which the stirring part 12 is provided.

The surface region S1 is preferably at least a surface region that is exposed to a high temperature and an oxygen-containing gas atmosphere during use. Here, the high temperature, for example, is 1000° C. or more. The oxygen-containing gas atmosphere, for example, is an oxygen gas atmosphere, an air atmosphere or a gas atmosphere in which an oxygen partial pressure is adjusted. The oxidation volatilization consumption of iridium occurs when the surface of the rotary shaft 11 is exposed to the high temperature and the oxygen-containing gas atmosphere, however by covering with the cover 20, the contact with oxygen is limited, and it is possible to prevent the oxidation volatilization consumption of iridium. The surface region exposed to the high temperature and the oxygen-containing gas atmosphere during use is specifically a surface region of the surface of the rotary shaft 11 that is not immersed in the glass melt.

As illustrated in FIG. 2, the cover 20 forms a two-layer structure in which the outer layer 22 made of platinum or a platinum rhodium alloy and the inner layer 21 made of platinum or the platinum-rhodium alloy containing the metal species are joined. The rhodium content of the platinum rhodium alloy is preferably, for example, 30 mass % or less. Here, the outer layer 22 prevents the inner layer 21 from coming into contact with the oxygen-containing gas atmosphere, and further prevents the rotary shaft 11 from coming into contact with the oxygen-containing gas atmosphere. Meanwhile, the inner layer 21 serves as a diffusion interception layer which prevents the mutual diffusion with the rotary shaft 11. As illustrated in FIG. 2, the oxide particles 23a of the metal species precipitated on the surface 21b of the inner layer 21 in a dispersed state preferably protrude from the surface 21b, and the surface 11a of the rotary shaft 11 and the surface 21b of the inner layer 21 are not in contact with each other by the protrusion, or even when the surfaces are in contact with each other, the contact area decreases. That is, the oxide particles 23a of the metal species precipitated on the surface 21b of the inner layer 21 in the dispersed state serves as a spacer. Since the contact between the surface 11a of the rotary shaft 11 and the surface 21b of the inner layer 21 is restricted, the mutual diffusion of the rotary shaft 11 (iridium or the iridium-based alloy) and the inner layer 21 (platinum as a main component) is prevented, and an occurrence of Kirkendall voids is prevented. Further, the inner layer 21 and the rotary shaft 11 may be in partially contact with each other. In this case, by the presence of the oxide particles 23a of the metal species, an area of a location at which platinum of the inner layer 21 and iridium of the rotary shaft 11 can be mutually diffused is limited, and the oxide particles 23a itself of the metal species restrict the progression of mutual diffusion. In this way, since the inner layer 21 serves as the diffusion interception layer, the thickness thereof is preferably 0.1 mm or more, and more preferably 0.2 mm or more. If the thickness is less than 0.1 mm, when exposed to the high temperature and the oxygen-containing gas atmosphere for 1000 hours or more, or when there is no contact between platinum of the inner layer 21 and iridium of the rotary shaft 11 by the oxide particles 23a of the metal species, there is no risk of progression of the mutual diffusion; however, if when there is a contact location, there is a slight risk of progression of the mutual diffusion, but the diffusion layer is rarely observed even in the contact.

The oxide particles 23a of the metal species are preferably particles in which the metal species contained in the inner layer 21 are oxidized and precipitated, and particles grow, by performing oxidation treatment on the cover 20. It is possible to reduce the volume of the clearance space, without bringing the surface of the rotary shaft 11 made of iridium or iridium-based alloy into contact with the cover 20. As the metal species which are made to contain in platinum as the alloy and can readily precipitate the oxide particles 23a of the metal species on the surface by the oxidation treatment, it is preferable to adopt at least one kind selected from zirconium (Zr), aluminum (Al), silicon (Si), titanium (Ti), yttrium (Y), hafnium (Hf), tantalum (Ta), magnesium (Mg), cerium (Ce) and chromium (Cr). In the selection of the metal species, conventionally, it is possible to use the same kind as the metal species that can be applied to the oxide dispersion reinforced platinum.

As illustrated in FIG. 2, the oxide particles of the metal species may be dispersed as oxide particles 23b in the interior of the inner layer 21, and in this case, the inner layer 21 is the oxide particle dispersion reinforced platinum in which oxide is densely arranged on the surface of the 21b side. Moreover, by the spacer type role of the oxide particles 23a of the metal species, a slight clearance space 24 may be present between the inner layer 21 and the rotary shaft 11. Oxygen is contained in the clearance space 24, and may also be consumed in the oxidation volatilization consumption of iridium of the rotary shaft 11; however, since the quantity of oxygen is very small, as long as there is a limitation so that new oxygen does not flow into the clearance space 24, the oxidation volatilization consumption of iridium of the rotary shaft 11 does not occur to the level of causing a problem.

A countermeasure for preventing new oxygen from flow into the clearance space 24 will be described. The cover 20 is preferably welded to the rotary shaft 11 at the edge parts (an upper end 250 and a lower end 252) over the entire circumference, and the surfaces of the welded parts 25a and 25b are more preferably covered with a platinum build-up welding. By welding the cover 20 to the rotary shaft 11 at the edge parts over the entire circumference, the clearance space 24 is sealed, and oxygen does not flow into the clearance space 24. In the welded parts 25a and 25b, the material constituting each of the outer layer 22 (platinum) of the cover 20, the inner layer 21 (platinum), and the rotary shaft 11 (iridium) is converted into an alloy by welding, and specifically, an iridium-platinum alloy is obtained. Although the inflow of oxygen to the clearance space 24 caused by the welded parts 25a and 25b is prevented, since the welded parts 25a and 25b are converted into the iridium-platinum alloy, if exposed to oxygen-containing gas atmosphere, the oxidation volatilization consumption of iridium is likely to occur. Therefore, by covering the welded parts 25a and 25b with the platinum build-up welding, it is possible to block the contact with oxygen-containing gas atmosphere and to prevent the volatilization and consumption.

When the cover 20 is welded to the rotary shaft 11, it is preferable to perform the vacuum-seal of the clearance space 24. It is possible to further prevent the oxidation volatilization consumption of iridium of the rotary shaft 11. In addition, bulging caused by the residual gas is less likely to occur at the time of high-temperature use. For example, an exhaust pipe 26 which communicates with the clearance space 24 is provided in the cover 20, after welding the edge parts of the cover 20, the clearance space 24 is evacuated through the exhaust pipe 26, and thereafter, vacuum-sealing of the clearance space 24 can be performed by being sealed with the exhaust pipe 26.

Another countermeasure for preventing new oxygen from flowing into the clearance space 24 will be described. By disposing the edge parts of the cover 20 in a region that is not exposed to the oxygen-containing gas atmosphere, for example, in the glass melt, it is possible to prevent the volatilization and consumption of the rotary shaft 11, without causing the inflow of new oxygen into the clearance space 24 from the edge parts etc. of the cover 20.

In this way, since the cover 20 prevents the oxidation volatilization consumption of iridium of the rotary shaft 11 and the generation of the Kirkendall voids, the rotary shaft 11 with the attached cover 20, for example, can be stably used at the high temperature and in the oxygen-containing gas atmosphere of 1000 hours or more for a prolonged period of time, while maintaining the high strength.

It is preferable that the lower end of the cover 20 is disposed in the glass melt during use, and the upper end of the cover 20 is disposed outside the furnace. It is possible to more reliably prevent the surface of the rotary shaft 11 which is not covered with the cover 20 from being exposed to the high temperature and the oxygen-containing gas atmosphere. Further, when the lower end of the cover 20 is disposed in a glass melt during use, the platinum build-up welding may not be performed in the welded part 25b of the lower end of the cover 20. Of course, the platinum build-up welding may be performed.

When the portion of the rotary shaft 11 covered with the cover 20 is immersed in the glass melt, the joined location or the contact location between the rotary shaft 11 and the cover 20 becomes a high temperature by the glass melt, and a thermal electromotive force is generated. This is a phenomenon (a Seebeck effect) that is similar to a so-called thermal electromotive force caused by thermocouple. If iridium and platinum are combined with each other, for example, the thermal electromotive force of about 23 mV is generated at 1500° C. Electrolysis bubbles (air bubbles) are generated on the cover 20 side by the thermal electromotive force. When the electrolysis bubbles are mixed into the glass, the yield of the glass is lowered, which significantly impairs the productivity. Therefore, in this embodiment, the surface region S2 of the cover 20 is surrounded by the pipe 30, and the air bubbles generated in the glass melt present between the pipe 30 and the cover 20 are released to the atmosphere, thereby preventing the air bubbles from spreading to the whole glass in the tank.

The pipe 30 is a cylindrical member that has at least an opening part 31 at the upper end and is not cut along the circumferential direction. As illustrated in FIG. 1, the pipe 30 has a cylindrical shape in which a lower part is reduced in diameter, or may be a waistless cylindrical shape (not illustrated) or a tapered shape in which a diameter increases upward (not illustrated). The pipe 30 is made of iridium or iridium-based alloy. The iridium-based alloy can be used as the material of the rotary shaft 11 and the stirring part 12 as an example. The pipe 30 is preferably made of the same material as the rotary shaft 11.

The pipe 30 surrounds the surface region S2 of the cover 20 at an interval. The expression "surrounding at an interval" means that the pipe 30 is disposed in non-contact with the cover 20 over the entire circumference of the outside of the cover 20. An interval between the cover 20 and the pipe 30 may be any interval through which the air bubbles generated on the side of the cover 20 can move upward in a space between the outer circumferential surface of the cover 20 and the inner circumferential surface of the pipe 30, and although it is not particularly limited, for example, a distance between the outer circumferential surface of the cover 20 and the inner circumferential surface of the pipe 30 is preferably 1 to 20 mm, and more preferably 3 to 10 mm.

The surface region S2 at least includes a surface region S2*a* of the cover 20 which is located at a predetermined height from the lower end of the cover 20. The predetermined height is a length from the lower end of the cover 20 to the position disposed on the liquid level L1 of the glass melt during use (illustrated in FIG. 3), a length from the lower end of the cover 20 to a position located below the liquid level L1 of the glass melt during use (not illustrated), or a length from the lower end of the cover 20 to a position disposed above the liquid level L1 of the glass melt during use (not illustrated). Among them, the predetermined height is more preferably the length from the lower end of the cover 20 to the position disposed on the liquid level L1 of the glass melt during use. Since the pipe 30 surrounds the cover 20 from the lower end of the cover 20 to the position disposed on the liquid level L1 of the glass melt during use, the upper end of the pipe 30 is disposed on the liquid level L1 of the glass melt during use. As a result, it is possible to prevent the mixing of air bubbles into the glass melt, and to prevent the oxidation and volatilization of iridium of the pipe 30. Since the pipe 30 surrounds the cover 20 from the lower end of the cover 20 to the position disposed below the liquid level L1 of the glass melt during use, the upper end of the pipe 30 is disposed below the liquid level L1 of the glass melt during use. As a result, it is possible to prevent the mixing of air bubbles into the glass melt to a minimum, and to prevent the oxidation and volatilization of iridium of the pipe 30. When the pipe 30 surrounds the cover 20 from the lower end of the cover 20 to the position disposed below the liquid level L1 of the glass melt during use, the distance from the liquid level L1 of the glass melt to the upper end of the pipe 30 is preferably 10 mm or less, and more preferably 5 mm or less. Since the pipe 30 surrounds the cover 20 from the lower end of the cover 20 to the position disposed above the liquid level L1 of the glass melt during use, the upper end of the pipe 30 is disposed above the liquid level L1 of the glass melt during use. As a result, it is possible to more reliably prevent the mixing of air bubbles into the glass melt. Further, when the upper end of the pipe 30 is disposed above the liquid level L1 of the glass melt during use, iridium is oxidized and volatilized in a portion of the pipe 30 above the liquid level L1 of the glass melt, but strength required for the portion of the pipe 30 above the liquid level L1 of the glass melt is weaker than the strength required for the rotary shaft 11, and the influence of the strength reduction due to the oxidation and volatilization is small.

As illustrated in FIG. 1, it is preferable that the pipe 30 also surrounds a surface region S2*b* of the rotary shaft 11 below the lower end of the cover 20 and above the stirring part 12, in addition to the surface region S2*a* of the cover 20 from the lower end of the cover 20 to a predetermined height. The lower end of the pipe 30 can be joined to the rotary shaft 11. Furthermore, by forming the pipe 30 and the rotary shaft 11 using the same material, since an electromotive force is not generated in the joined part between the pipe 30 and the rotary shaft 11, it is possible to prevent the generation of air bubbles.

It is preferable that the pipe 30 surrounds the surface region of the surface of the cover 20 that is immersed into the glass melt during use. Iridium of the pipe 30 can be prevented from being oxidized and volatilized. Further, it is possible to more reliably prevent the air bubbles from being mixed into the glass melt.

It is preferable that the pipe 30 has an occluded part 32 below the lower end of the cover 20. It is possible to more reliably prevent the air bubbles from being mixed into the glass melt. As illustrated in FIG. 1, the occluded part 32, for example, is a portion which reduces the diameter of the lower part of the pipe 30 so as to come into contact with the outer peripheral surface of the rotary shaft 10. In the occluded part 32, it is preferable to join the pipe 30 to the outer peripheral surface of the rotary shaft 11, for example, by welding, and it is more preferable to join the lower end of the pipe 30 to the rotary shaft 11 over the entire circumference. The form of the occluded part 32 in this embodiment is not limited to the form illustrated in FIG. 1, and for example, the occluded part 32 may be formed by occluding between the inner circumferential surface of the pipe 30 and the outer circumferential surface of the rotary shaft 11 with a sealing member (not illustrated).

The pipe 30 preferably has an extension part 33 which extends upward from the upper end of the pipe 30. The extension part 33 is a cylindrical member in which an upper end and a lower end are open and there is no cut over the circumferential direction. By providing the extension part 33, it is possible to more reliably prevent the air bubbles from being mixed into the glass melt. The lower end of the extension part 33 is joined to the upper end of the pipe 30, for example, by welding.

The extension part 33 is preferably made of platinum or platinum-based alloy. The platinum-based alloy is an alloy containing platinum as a main component. The metal component constituting the alloy with platinum in the platinum-based alloy is preferably at least one kind selected from rhodium (Rh), rhenium (Re), molybdenum (Mo), tungsten (W), niobium (Nb), tantalum (Ta), zirconium (Zr) and hafnium (Hf). The content of platinum in the platinum-based alloy is preferably 70 mass % or more, and more preferably 90 mass % or more. The pipe 30 is more preferably made of the platinum-rhodium alloy.

A glass melting furnace according to the present embodiment equipped with the stirrer for glass melting 10 according to the present embodiment is provided with a height adjusting mechanism which adjusts the height of the upper end of the pipe 30 to the liquid level L1 of the glass melt.

The height adjusting mechanism, for example, is an adjusting mechanism of the upper and lower mounting positions of the stirrer for glass melting 10, an adjusting mechanism of a liquid quantity of the glass melt, or a height adjusting mechanism of the glass melting furnace. Among them, the height adjusting mechanism is preferably the adjusting mechanism 40 of the upper and lower mounting positions of the stirrer for glass melting 10 and/or the adjusting mechanism of the liquid quantity of the glass melt.

REFERENCE SIGNS LIST 10 stirrer for glass melting
11 rotary shaft
11*a* surface of rotary shaft
12 stirring part
12*a* stirring blade
20 cover
21 inner layer
21*a* surface being in contact with outer layer of inner layer
21*b* surface of inner layer (surface on side opposite to surface 21*a*)

22 outer layer
23a oxide particles of metal species
23b oxide particles
24 clearance space
25a, 25b welded part
26 exhaust pipe
30 pipe
31 opening part
32 occluded part
33 extension part
S1 surface region of rotary shaft
S2 surface region of cover
S2a surface region of cover from lower end of cover to predetermined height
S2b surface region of rotary shaft below lower end of cover and above stirring part
L1 liquid level of glass melt

What is claimed is:

1. A stirrer for glass melting, the stirrer comprising:
a pipe comprising iridium or an iridium-based alloy that has an iridium content of 90 mass % or more;
a rotary shaft comprising iridium or the iridium-based alloy, the rotary shaft having a surface region;
a stirring part provided at a lower end of the rotary shaft, the stirring part comprising iridium or the iridium-based alloy; and
a cylindrical cover that covers the surface region at a location above the stirring part, the cylindrical cover having a two-layer structure in which (1) an outer layer comprises platinum or a platinum rhodium alloy and (2) an inner layer comprises platinum or a platinum rhodium alloy, the inner layer having oxide particles of the platinum or platinum rhodium alloy protruding from a surface of the inner layer,
wherein the cylindrical cover is welded to an entire circumference of the rotary shaft at both (1) an upper end of the cylindrical cover and (2) a lower end of the cylindrical cover,
wherein the pipe has an occluded part which reduces a diameter of a lower part of the pipe so as to come into contact with an outer peripheral surface of the rotary shaft, a lower end of the pipe is welded to an entire circumference of the rotary shaft at a location that is both (1) below the cylindrical cover and (2) above the stirring part an upper end of the pipe has an opening part, and the pipe is disposed, without, contacting the cylindrical cover, around a portion of the cylindrical cover.

2. The stirrer for glass melting of claim 1,
wherein the rotary shaft has a perpendicular orientation,
wherein the pipe has an upper end and an extension part,
wherein the extension part is joined to the upper end of the pipe by a weld and extends upward from the upper end of the pipe, and
wherein the extension part comprises platinum or a platinum-based alloy that has a content of platinum that is 70 mass % or more.

3. The stirrer for glass melting of claim 2, wherein the pipe surrounds a surface of the outer layer of the cover that is immersed into the glass melt during use.

4. The stirrer for glass melting of claim 1, wherein the pipe surrounds a surface of the outer layer of the cover that is immersed into the glass melt during use.

5. The stirrer for glass melting of claim 1, wherein the oxide particles are metal oxide particles selected from the group consisting of: oxides of zirconium (Zr), oxides of aluminum (Al), oxides of silicon (Si), oxides of titanium (Ti), oxides of yttrium (Y), oxides of hafnium (Hf), oxides of tantalum (Ta), oxides of magnesium (Mg), oxides of cerium (Ce) and oxides of chromium (Cr).

* * * * *